(12) United States Patent
Li et al.

(10) Patent No.: US 10,390,316 B2
(45) Date of Patent: Aug. 20, 2019

(54) METHODS OF ENABLING MEASUREMENTS FOR HANDLING OF A DEVICE-TO-DEVICE D2D SIDE LINK IN A CELLULAR SYSTEM

(71) Applicant: Telefonaktiebolaget LM Ericsson (publ), Stockholm (SE)

(72) Inventors: Shaohua Li, Beijing (CN); Qianxi Lu, Beijing (CN); Xinghua Song, Beijing (CN); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 21 days.

(21) Appl. No.: 15/563,973

(22) PCT Filed: Apr. 10, 2015

(86) PCT No.: PCT/CN2015/076331
§ 371 (c)(1),
(2) Date: Oct. 3, 2017

(87) PCT Pub. No.: WO2016/161634
PCT Pub. Date: Oct. 13, 2016

(65) Prior Publication Data
US 2018/0139706 A1    May 17, 2018

(51) Int. Cl.
*H04L 12/26* (2006.01)
*H04W 52/38* (2009.01)
(Continued)

(52) U.S. Cl.
CPC ........ *H04W 52/383* (2013.01); *H04B 17/318* (2015.01); *H04W 24/10* (2013.01);
(Continued)

(58) Field of Classification Search
CPC ............ H04W 52/383; H04W 52/242; H04W 52/241; H04W 52/245; H04W 24/10;
(Continued)

(56) References Cited

U.S. PATENT DOCUMENTS

2015/0078270 A1    3/2015  Seo et al.

FOREIGN PATENT DOCUMENTS

CN    103139856 A    6/2013
WO    2014089398 A1    6/2014
(Continued)

OTHER PUBLICATIONS

Extended European Search Report for EP Application 15888191.2, dated Oct. 15, 2018, 9 pages.

*Primary Examiner* — Mang Hang Yeung
(74) *Attorney, Agent, or Firm* — Sage Patent Group

(57) ABSTRACT

The disclosure relates to a method (20) of enabling measurements for handling of a device-to-device, D2D, side link in a cellular system (10). The method (20) is performed in a first D2D capable device (12) and comprises providing (21), to a second D2D device (13), information relating to a first transmission power of a first transmission between the first D2D device (12) and the second D2D device (13), wherein the first transmission power is used by the first D2D capable device (12), and receiving (22), from the second D2D device (13), a measurement report based on the provided information relating to the first transmission power. A method (30) performed in a second D2D device (13), D2D devices (12, 13), computer programs (42a, 42b, 52a, 52b) and computer program products (41, 51) are also provided.

10 Claims, 4 Drawing Sheets

(51) Int. Cl.
*H04W 24/10* (2009.01)
*H04W 72/04* (2009.01)
*H04W 72/08* (2009.01)
*H04W 52/24* (2009.01)
*H04B 17/318* (2015.01)
*H04W 4/70* (2018.01)
*H04W 88/06* (2009.01)
*H04W 92/18* (2009.01)

(52) U.S. Cl.
CPC ....... *H04W 52/241* (2013.01); *H04W 52/242* (2013.01); *H04W 52/245* (2013.01); *H04W 72/0473* (2013.01); *H04W 72/085* (2013.01); *H04W 4/70* (2018.02); *H04W 88/06* (2013.01); *H04W 92/18* (2013.01)

(58) Field of Classification Search
CPC ........... H04W 72/085; H04W 72/0473; H04W 88/06; H04W 92/18; H04W 4/70; H04B 17/318
USPC ........................................................ 370/252
See application file for complete search history.

(56) References Cited

FOREIGN PATENT DOCUMENTS

| | | | | |
|---|---|---|---|---|
| WO | 2014196906 | A1 | 12/2014 | |
| WO | WO-2014196906 | A1 * | 12/2014 | ............ H04W 52/12 |
| WO | 2015019179 | A2 | 2/2015 | |

* cited by examiner

METHODS OF ENABLING MEASUREMENTS FOR HANDLING OF A DEVICE-TO-DEVICE D2D SIDE LINK IN A CELLULAR SYSTEM

TECHNICAL FIELD

The technology disclosed herein relates generally to the field of device-to-device communication, and in particular to methods, devices, computer programs and computer program products for enabling accurate measurements for handling of a device-to-device side link in a cellular system, e.g. in view of power control and link adaptation.

BACKGROUND

Proximity-based applications and services represent an emerging social-technological trend. In $3^{rd}$ Generation Partnership Project (3GPP), a Proximity Service (ProSe) capability is to be introduced in Long Term Evolution (LTE), in particular in specification Release 12 (Rel-12). ProSe is also known as Device-to-Device (D2D) communication and enables direct communication for instance between nearby mobile terminals of a wireless system.

D2D communication has been proposed as an underlay to cellular networks, i.e. D2D using the same spectral resources as used for the cellular network. This would take advantage of the proximity of communicating devices and at the same time allow devices to operate in a controlled interference environment. The D2D communication could share the same spectrum as the cellular communication for example by reserving some of the cellular uplink resources for D2D purposes. Allocating dedicated frequency spectrum for D2D purposes is a less attractive alternative since spectrum is a scarce resource. A dynamic sharing of resources between the D2D services and cellular services is more flexible and provides higher spectrum efficiency.

In Rel-12 there is only a forward link (from the sender to the receiver) for D2D communication and no reverse link (from the receiver to the sender). In Rel-13, D2D reverse link may be introduced. In such reverse link, the reception node may provide channel state information (CSI) feedback, radio resource management (RRM) measurements (for instance Reference Signal Received Power, RSRP, or Reference Signal Received Quality, RSRQ), and acknowledgements (ACKs) and negative acknowledgments (NACKs). For either forward link or reverse link, power control may be employed for improving the D2D link performance and efficiently reduce the interference towards the wireless access network (WAN) system (e.g. LTE).

According to current LTE specification for D2D transmission, the D2D transmission power in a D2D side link is subject to cellular power control. With the cellular power control, the transmission power in D2D side link may be changed, which will lead to the transmit power of the reference signal in the D2D link changing dynamically. The transmission power is subject to dynamic changes for other reasons as well, e.g. due to one or both of the communicating parties moving fast and/or moving into a less favorable radio environment.

With such dynamically changing transmission power it is a challenge for the reception node to estimate the pathloss to the transmitting node, and thus difficult to perform power control for the D2D reverse link in order to mitigate D2D link interference. Further, it is also a challenge for the reception node to estimate CSI for the D2D forward link due to the dynamically changing transmission power. There is a need for methods to handle these and other problems relating to the D2D link resulting e.g. from the dynamically changing transmission power.

SUMMARY

An objective of the present disclosure is to solve or at least alleviate at least one of the above mentioned problems.

The objective is according to an aspect achieved by a method of enabling measurements for handling of a device-to-device, D2D, side link in a cellular system. The method is performed in a first D2D capable device and comprises providing, to a second D2D device, information relating to a first transmission power of a first transmission between the first D2D device and the second D2D device, wherein the first transmission power is used by the first D2D capable device, and receiving, from the second D2D device, a measurement report based on the provided information relating to the first transmission power.

By having the transmitting node send information about a transmission power used, the method enables more accurate measurements to be performed in the reception node. In response, the transmitting node receives a measurement report which is more accurate since it is based on the provided information relating to the transmission power. The transmission power is subject to power control from the cellular system, and may change dynamically, also due to e.g. the transmitting node moving, or performing another D2D transmission. The method enables improved measurements to be done also in such dynamically changing environment.

The objective is according to an aspect achieved by a computer program for a first device-to-device, D2D, capable device for enabling measurements for handling of a device-to-device, D2D, side link in a cellular system. The computer program comprises computer program code, which, when executed on at least one processor on the first D2D capable device causes the first D2D capable device to perform the method as above.

The objective is according to an aspect achieved by a computer program product comprising a computer program as above and a computer readable means on which the computer program is stored.

The objective is according to an aspect achieved by a first D2D capable device for enabling measurements for handling of side link in a cellular system. The first D2D capable device is configured to provide, to a second D2D device, information relating to a first transmission power of a first transmission between the first D2D device and the second D2D device, wherein the first transmission power is used by the first D2D capable device, and receive, from the second D2D device, a measurement report based on the provided information relating to the first transmission power.

The objective is according to an aspect achieved by a method of enabling measurements for handling of a device-to-device, D2D, side link in a cellular system. The method is performed in a second D2D capable device and comprises receiving, from a first D2D device, information relating to a first transmission power of a signal used between the first and second D2D devices, and establishing, based on the received information, a measurement report.

The method provides several advantages. The method enables for instance a more accurate pathloss estimation to be performed in a reception node, and also a more accurate CSI estimation. The method may be used for efficient power control for D2D transmissions as well as for efficient link adaptation for D2D communication.

The objective is according to an aspect achieved by a computer program for a second device-to-device, D2D, capable device for enabling measurements for handling of a device-to-device, D2D, side link in a cellular system. The computer program comprises computer program code, which, when executed on at least one processor on the second D2D capable device causes the second D2D capable device to perform the method as above.

The objective is according to an aspect achieved by a computer program product comprising a computer program as above and a computer readable means on which the computer program is stored.

The objective is according to an aspect achieved by a second D2D capable device for enabling measurements for handling of a device-to-device, D2D, side link in a cellular system. The second D2D capable device is configured to receive, from a first D2D device, information relating to a first transmission power of a signal used between the first and second D2D devices, and establish, based on the received information, a measurement report.

Further features and advantages of the present disclosure will become clear upon reading the following description and the accompanying drawings.

DETAILED DESCRIPTION

Figure 1A:
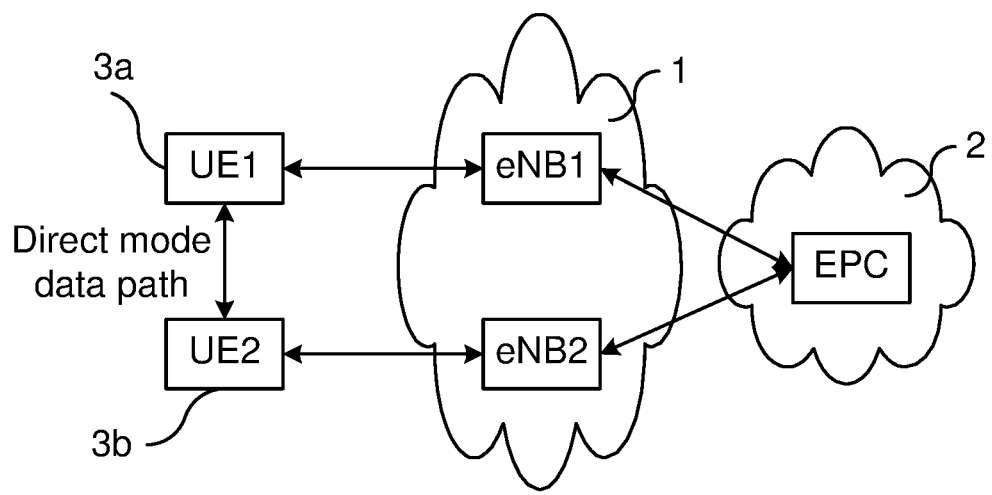
FIGS. 1a and 1b illustrate different D2D communication setups.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 1B:
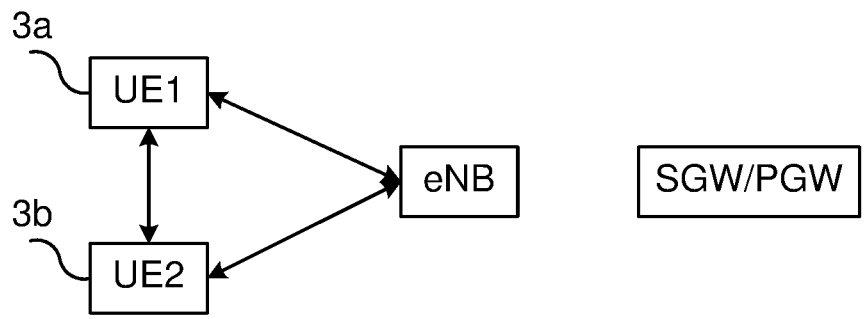

In order to provide thorough understanding of the present teachings, some aspects of D2D communication are described initially with reference to FIGS. 1a and 1b, which illustrate different D2D communication setups.

FIG. 1a illustrates a first type of D2D communication mode. In particular, a direct mode data path is illustrated for the case of Long Term Evolution (LTE). In the 3GPP LTE spectrum, a data path (user plane) can be moved off an access network 1 and a core network 2 onto a direct link between a first and a second mobile terminal 3a, 3b. The mobile terminals 3a, 3b are typically denoted user equipment (UE) in LTE, but may be denoted e.g. terminal, a mobile station, a subscriber unit, etc. The UE 3a, 3b may be any device capable of D2D communication, e.g. a cellular phone, a personal digital assistant (PDA), a wireless modem, a wireless communication device, a handheld device, a laptop computer, sensor devices etc.

The access network 1 is in the FIG. 1a illustrated as comprising evolved Node Bs (eNBs), which are arranged to provide wireless communication for the UEs 3a, 3b residing within their coverage areas. The access nodes of the access network 1 may also be denoted in different ways, e.g. as base stations, access points etc. and it is realized that the access network 1 may comprise various types of other nodes as well. The core network 2 is illustrated as an evolved packet core (EPC), which comprises various network nodes.

A direct link that a first UE 3a has to a second UE 3b is also denoted side link in the context of a cellular system, and a physical Side link Shared channel (PSSCH) carries data from the first UE 3a to the second UE 3b for the D2D communication. A Physical side link control channel (PSCCH) is mapped to side link control resources and indicates the resources and other transmission parameters used by the first UE 3a for the PSSHC.

FIG. 1b illustrates another D2D communication mode in LTE. For the case that the UEs 3a, 3b are served by the same eNB, a locally routed data path can be provided between them, i.e. without involvement by the core network 2.

Instead of the communication path between the UEs 3a, 3b being a cellular communication, i.e. going from the first UE 3a via its serving eNB, a serving gateway/packet data network gateway (SGW/PGW), to the serving eNB of the second UE 3b to second UE 3b (FIG. 1b), or from the first UE 3a to the second UE 3b via their common serving eNB (FIG. 1a), the UEs 3a, 3b communicate directly over the air with each other using the side link.

There are different ways for the UEs 3a, 3b to find each other, denoted type 1 and type 2 discovery. In type 1 discovery, a network node of the cellular access network broadcasts a set of resources that can be used by the UEs 3a, 3b for discovery signal transmission. In type 2 discovery, the network node controls the discovery, and allocates specific resources for transmission of the discovery signal to the UEs.

A transmitting UE 3a may operate in two modes for resource allocation: Mode 1 and Mode 2. In Mode 1, the network node schedules the exact resources used by the UE 3a to transmit data and control information on the D2D link. In Mode 2, the UE selects on its own resources from a resource pool for the transmission of data and control information on the D2D link.

In Rel-12, a power control mechanism is specified. In particular, an open loop power control mechanism is specified for:
 D2D Synchronization signal (SS) and for Physical D2D Synchronization Channel (PD2DSCH), when supported,
 Mode 2 communication, wherein the D2D capable devices are within coverage of the cellular system (also denoted In-coverage UEs), and also for
 the type 1 and type 2 discovery.

In the specified power control mechanism, the parameters for power control are configurable. The current Physical Uplink shared channel (PUSCH) uplink power control (of LTE) is the baseline for the above mentioned power control mechanism, which may implement either full or partial pathloss compensation power control scheme. That is, an increased pathloss is fully or partially compensated for by a corresponding increase in the uplink transmit power. In that case, the received power and thus the received signal to interference and noise ratio (SINR) per resource block will vary with the pathloss and consequently the scheduled modulation and coding scheme should vary accordingly. The power control parameters may be configured via Radio Resource Control (RRC) signaling. There are three power range classes, and an upper layer authorization provides applicable power range classes of the UEs 3a, 3b. A maximum allowed transmission power for each range class is signaled in RRC signaling, in particular System Information Block 19 (SIB19). This is one type of cellular power regulation that may affect also the D2D link. The UE 3a, 3b uses the applicable maximum allowed transmission power corresponding to its authorized range class. This puts an upper limit on the determined transmit power based on open loop power control parameters.

Figure 2:
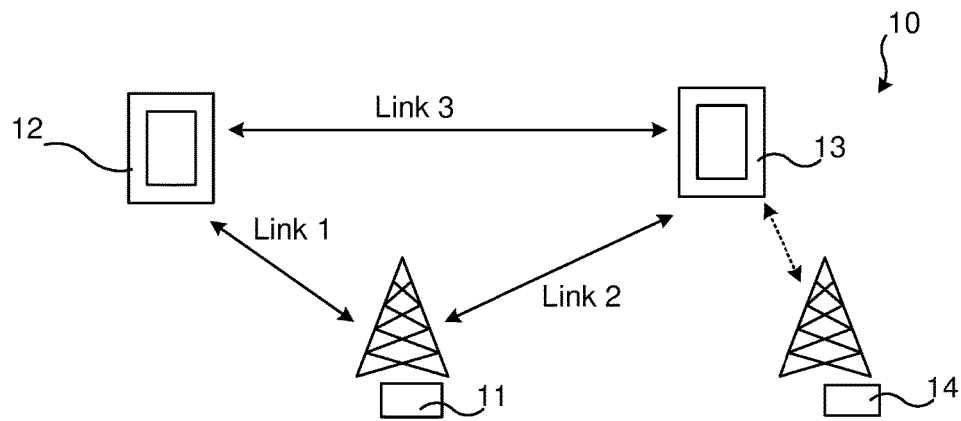
FIG. 2 illustrates schematically an environment in which embodiments according to the present teachings may be implemented.

FIG. 2 illustrates schematically an environment in which embodiments according to the present teachings may be implemented. It is noted that the above description in relation to FIGS. 1a and 1b are applicable also for the present teachings, and a D2D communication may be established as described in relation to these figures.

A cellular system lo comprises a radio access network comprising a number of network nodes 11, 14 that are arranged to provide wireless communication for mobile terminals 12, 13 that reside within their coverage areas. The wireless communication may for instance be provided according to LTE specifications. In LTE such network nodes 11, 14 may be denoted eNBs. The eNBs 11, 14 are typically interconnected with each other by wired connections, and also with nodes of a core network (not illustrated in FIG. 2). The eNBs 11, 14 comprises processing circuitry, antenna systems etc. which enable the wireless communication. The mobile terminals 12, 13, in the following also denoted UEs, may have such wireless communication link to one or more eNBs 11, 14.

In FIG. 2 a first UE 12 is illustrated as having a first link (denoted Link 1 in the figure) to a first eNB 11, and a second UE 13 is illustrated as having a second link (denoted Link 2 in the FIG. 2) to the first eNB 11. The first and second UEs 12, 13 are D2D capable devices and may also have a side link (denoted Link 3 in the figure) over which they may communicate directly with each other, as has been described with reference to FIGS. 1a and 1b. The present teachings are applicable also for the situation of the second UE 13 being served by another eNB 14 than the first UE 12. This situation is indicated schematically by the dotted arrow between the second UE 13 and the second eNB 14, and is described also with reference to FIG. 1a.

In various embodiments of the present teachings, methods are provided for performing accurate measurements in a reception node for enabling efficient power control and link adaptation of a D2D link between a transmitting node and the reception node (e.g. Link 3 between the first and second UEs 12, 13 of FIG. 2).

Briefly, efficient transmission power allocation methods are provided and corresponding signaling for a side link to facilitate pathloss estimation and/or CSI (e.g. CQI/PMI/RI) estimation. Further, efficient CSI estimation methods are provided for overcoming difficulties related to the dynamically changing transmission power of the side link, e.g. dynamically changing transmission power of the PSSCH.

In various embodiments of the present teachings a method in a transmitting node 12 is provided. A transmission power allocation mechanism is provided e.g. for a reference signal (RS) in the side link between the first UE 12 and the second UE 13, wherein the side link (Link 3, FIG. 2) is subject to dynamically varied transmission power.

In the following, the first UE 12 is used as an example of a transmitting node, and the second UE 13 is used as an example of a reception node. It is however noted that both UEs 12, 13 may act as transmitting nodes as well as reception nodes, and thus both may implement the method in a transmitting node as well as the method in a reception node.

In order to facilitate e.g. a pathloss estimation and CSI estimation in the reception node 13, information about the dynamically changed transmission power applied for a reference signal may, in some embodiments, be provided by the transmitting node 12 to the reception node 13. Here, reference signals (RSs) to use may be designed specifically for measurement RS (MRS), and also for demodulation RS (DMRS). It is noted that the signals for which transmission power information is provided, and on which to measure on need not be reference signals, but may also comprise control signals and/or payload data signals.

In some embodiments, the information about the dynamically changed transmission power applied for the reference signal may include not only the transmission power, but also the interval during which the transmission power will be applied. During the given interval, the RS transmission power may be fixed.

In some other embodiments, the information about the dynamically changed transmission power applied for the reference signal may be an indicator. The indicator may indicate that a filter is to be reset whenever the transmission power of the RS is changed. As an alternative, the indicator may indicate the transmission power adjustment compared to the latest transmission power.

In some embodiments, the information about the transmission power may be derived from a power limit given by a cellular controller. As an example, the RS transmission power may have some offset from a power limit given by a cellular controller.

In some embodiments, the method in the reception node 13 comprises acquiring information about the dynamically changed transmission power applied for the reference signal (in particular receiving the information from the transmitting node 12), measuring the received transmission power and estimating a measurement object by removing the impact caused by the dynamically changing transmission power from the measured received transmission power by using the acquired information. The measurement object may for instance comprise pathloss, signal to interference and noise ratio (SINR), channel impulse response etc. The measurement object may also comprise channel state information (CSI), such as channel quality indicator (CQI), precoding matrix indication (PMI), or rank indicator (RI) etc.

Due to the side link transmission power being subjected e.g. to a power constraint of the cellular network, the transmission power of e.g. the PSSCH may be varied from subframe to subframe, and this information cannot be updated instantaneously for CSI reporting. The changing transmission power would hence reduce the accuracy and usability of CSI reports transmitted from reception node 13 to the transmitting node 12.

In order to provide CSI feedback that reflects the dynamic change of e.g. the PSSCH transmission power, an offset may be used. The offset may indicate an offset of the measured RS transmission power from an assumed transmission power, i.e. a hypothetical transmission power, used for the estimation of the measurement object.

In some embodiments, the reception node 13 may thus perform CSI feedback based on a plurality of transmission power assumptions. The information acquired from the transmitting node 12 about the transmission power applied for the RS may comprise a plurality of such hypothetical (assumed) transmission power levels. Alternatively, the information about the hypothetical transmission power levels may be configured by higher layers or be signaled to the reception node 13. The reception node 13 may then calculate CSI values per hypothetical transmission power assumption, and a plurality of CSI values may be fed back from the reception node 13 to the transmitter node 12 in a CSI report.

The transmitting node 12 may decide the CSI to be actually used based on the relation between instantaneous transmitted power of the PSSCH (of Link 3 in FIG. 3), the transmission power used on the measurement reference signal (MRS) and the obtained CSI feedback (the CSI report), as will be described in the following.

In the following some particular examples are provided for performing CSI feedback:

Example 1

At the reception node 13, a plurality of CSI values may be provided in the CSI report according to:

$CSI_m$ is calculated assuming the transmitted power is
$P_{MRS}^{(t_0)} - m\delta$ where $m=-(M-1), \ldots, M$ and M is the number of the hypothetical transmission power assumptions, and $t_0$ is a first instance in time. The number M may be configured by higher layers or be dynamically signaled. An offset value $\delta$ may also be configured by higher layers or be dynamically signaled. In other embodiments, the values of one or both of M and $\delta$ may be predefined, e.g. preconfigured in the UEs 12, 13.

The transmitting node 12, having received the CSI report comprising the M ($P_{MRS}^{(t_0)} - m\delta$) values, first decides the transmitted power $P_{PSSCH}^{(t_n)}$ at time instance $t_0$ based on the power subjected to cellular power control, which may use either maximum transmission power level or an open-loop power control scheme according to the used side link transmission mode (i.e. Mode 1 or Mode 2, as described earlier) and a transmission power control (TCP) command field (set to 1 or 0) in the configured side link grant, if transmission Mode 1 is adopted. The decision on the transmitted power $P_{PSSCH}^{(t_n)}$ subjected to then determines the m which minimizes the offset of ($P_{MRS}^{(t_0)} - m\delta$) to $P_{PSSCH}^{(t_n)}$. Given the determined m, the corresponding $CSI_m$ value of the CSI report may be used for selecting the modulation and coding scheme (MCS) to use in subsequent transmissions.

Example 2

In the previous example, only the number of the hypothetical transmission power assumption and one offset $\delta$ value are provided. In the present example, a plurality of offset $\delta$ values may be provided. For example, $\delta_0, \delta_1, \ldots,$ and $\delta_{M-1}$ may be provided. $CSI_m$ is calculated based on $P_{MRS}^{(t_0)} - \delta_m$ (M=0, 1, ..., M-1).

The transmitting node 12, having received the CSI report comprising the M ($P_{MRS}^{(t_0)} - \delta_m$) values, first decides the transmitted power $P_{PSSCH}$ at time instance $t_n$ based on a power control constraint from the cellular system, then determines the m by which the offset of ($P_{MRS}^{(t_0)} - \delta_m$) to $P_{PSSCH}^{(t_n)}$ is minimized. Given the determined m, the corresponding $CSI_m$ value of the CSI report can be used for the final MCS selection. These offset values $\delta$ may for instance be signaled, or they may be predefined.

Example 3

In Example 1 and Example 2, a relative power offset between the transmitted power and hypothetical transmission power is provided. In this third example, a plurality of absolute transmission powers may be provided for the CSI calculation.

In an embodiment, CSI estimation is derived in the reception node 13 assuming the transmission power is the same as the latest dynamic transmission power of e.g. PSSCH within a predefined timing window in case the dynamic transmission power of PSSCH is available.

Figure 3:
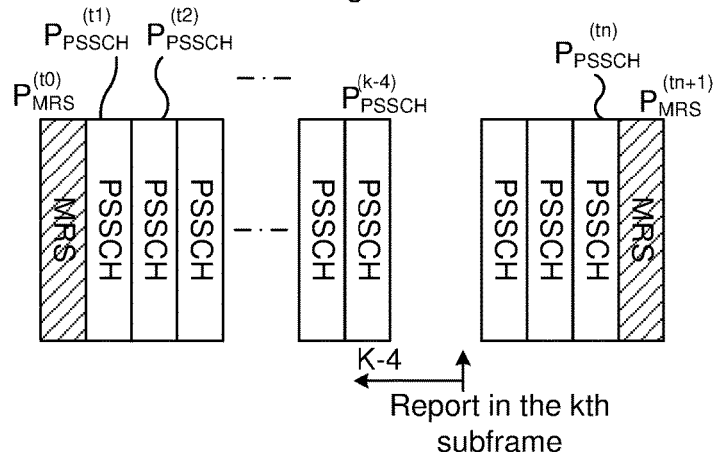
FIG. 3 illustrates an example of assuming constant transmission power during a time interval.

FIG. 3 illustrates an example of this. The transmitted power for MRS, $P_{MRS}$, may at time) instances $t_0, t_{n+1}$ be $P_{MRS}^{(t_0)}, \ldots, P_{MRS}^{(t_{n+1})}$, the transmitted power for PSSCH may correspondingly be $P_{PSSCH}^{(t_1)}, \ldots, P_{PSSCH}^{(t_n)}$.

The CSI estimation may be derived in different ways. It may be assumed that the CSI report is performed in the kth subframe, that the timing window is $[-\infty, k-4]$, and that $P_{PSSCH}^{(k-4)}$ is used as the assumed transmission power. Based on the difference of $P_{PSSCH}^{(k-4)}$ and $P_{MRS}^{(t_0)}$, the reception node 13 may derive the CSI values of the CSI report.

At the transmitting node 12, for the coming subframes close to the k:th subframe, the MCS to use could be decided based on the difference between instantaneous transmission power $P_{PSSCH}^{(k-4)}$ and the available CSI values of the CSI report received from the reception node 13.

In another embodiment, CSI values may be derived in the reception node 13 assuming the transmission power with some offset from the latest dynamic transmission power of PSSCH within a predefined timing window. As mentioned earlier, the offset $\delta$ may be signaled or predefined.

In the above examples, assuming the offset is $\delta$, then for the kth CSI report, ($P_{PSSCH}^{(k-4)} - \delta$) is used as the assumed transmission power. Based on the difference of ($P_{PSSCH}^{(k-4)} - \delta$) and $P_{MRS}^{(t_0)}$, the reception node 13 may derive the CSI values of the CSI report.

The features and embodiments of the present teachings that have been described may be combined in different ways, examples of which are given in the following, with reference first to FIG. 4.

Figure 4:
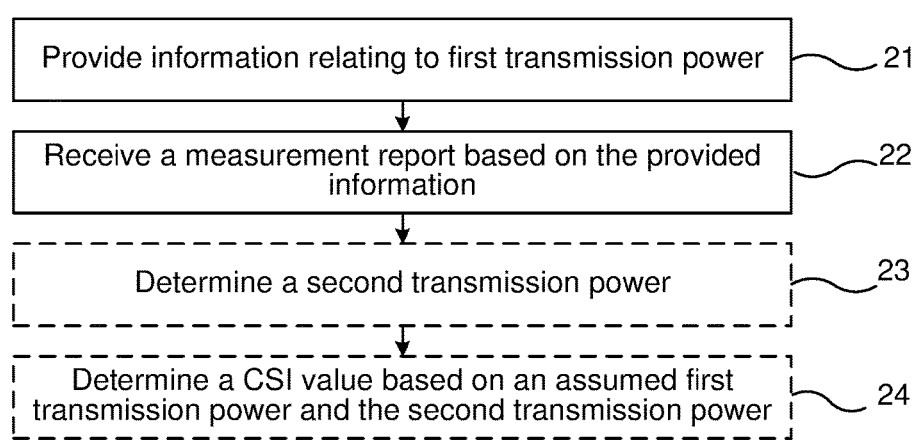
FIG. 4 illustrates a flow chart over steps of a method in a D2D capable device in accordance with an embodiment of the present teachings.

FIG. 4 illustrates a flow chart over steps of a method in a D2D capable device in accordance with an embodiment of the present teachings.

A method 20 of enabling measurements for handling of a device-to-device, D2D, side link in a cellular system 10 is provided. The handling of the side link may for instance comprise power control of the side link and/or providing of measurement reports and subsequent link adaptation. The method 20 is performed in a first D2D capable device 12, in particular a transmitting device.

The method 20 comprises providing 21, to a second D2D device 13, information relating to a first transmission power of a first transmission between the first D2D device 12 and the second D2D device 13, wherein the first transmission power is used by the first D2D capable device 12. The information relating to the first transmission power may be provided in a transmission from the first D2D device 12 to the second D2D device 13, i.e. the first D2D device 12 transmitting the information over the D2D sidelink.

The method 20 comprises receiving 22, from the second D2D device 13, a measurement report based on the provided information relating to the first transmission power.

The method 20 provides an improved power control of D2D side links in cellular systems, wherein the D2D side link is subject to power control from the cellular system and dynamically changing transmission power. The second D2D capable device 13, the receiving device, is provided with information about the transmission power and is thereby enabled to perform an accurate measurement, e.g. a pathloss measurement, even for the case that the transmission power changes dynamically. The second D2D capable device 13 is then able to provide a correspondingly more accurate measurement report, e.g. a CSI report, to the first D2D capable device 12, whereby the first D2D capable device 12 can perform link adaptation based on the more accurate measurement values.

In an embodiment the information relating to the first transmission power comprises a first transmission power value. This first transmission power value may comprise an explicit value of the transmission power actually used by the first D2D capable device 12, which enables the second D2D capable device 13 to correct for any measurement. For instance, the first D2D capable device 12 transmits a reference signal using transmission power $P_{Tx}$. The second D2D capable device 13 measures on this reference signal, and estimates e.g. reference signal received power (RSRP) thereof. Having received information about the used transmission power $P_{Tx}$, the second D2D capable device 13 is now in position to determine an accurate instantaneous pathloss to be the difference between $P_{Tx}$ and the estimated RSRP.

After removing the $P_{Tx}$ from the RSRP, an actual pathloss may be estimated by filtering of instantaneous pathloss estimations for different transmission occasions. A still further improved accuracy is obtained. It is noted that this is different from conventional pathloss estimations, wherein the reference power is fixed.

As another example, instead of estimating RSRP, the second D2D capable device 13 may measure the reference signal sent by the first D2D capable device 12 and estimate SINR based on this measurement and the received information about the first transmission power. As a particular example thereof the second D2D capable device 13 estimates SINR for the k:th transmission interval, and scales down the SINR(k) based on the received information about the first transmission power. The scaled SINR(k) is then filtered and by combining the received information about the first transmission power with the filtered SINR(k), the filtered SINR(k) may be scaled up to obtain the estimated actual SINR for the latest transmission (e.g. (k+4):th transmission).

In a variation of the above embodiment, the information further comprises information about an interval during which the first transmission power value is considered constant.

In various embodiments, the information relating to the first transmission power comprises an indication of a power change of the first transmission power. The indicator may for instance indicate that a filter is reset whenever the power of the transmission (e.g. reference signal transmission) is changed. As another example, the indicator may indicate a transmission power adjustment compared to the latest used transmission power.

In various embodiments, the information relating to the first transmission power comprises a rule defining when a transmission power change of the first transmission power is to be expected.

In various embodiments, the measurement report comprises a channel state information, CSI, report, comprising an integer M number of CSI values. The method 20 comprises determining 23 a second transmission power of a second transmission between the first D2D device 12 and the second D2D device 13, wherein the second transmission power is subject to power control of the cellular system 10. For instance, the second transmission may for instance be transmission of the PSSCH.

The method 20 comprises determining 24 a CSI value of the CSI report to use for a subsequent transmission based on an assumed first transmission power and the determined second transmission power. A particular CSI value may be selected in different ways based on the first transmission power and the determined second transmission power, and the particular CSI value in turn being used e.g. for deciding on which MCS to use in the subsequent transmission.

In FIG. 4, these steps are shown in boxes drawn with dashed lines, which indicates that this is purely an embodiment, i.e. that these steps are optional.

In a first variation of the above embodiment, the m:th CSI value of the CSI report is based on a difference between the assumed first transmission power and m multiplied with a constant 6, and wherein the determining 24 comprises determining the CSI value to use based on the integer m which minimizes an offset of the assumed first transmission power to the determined second transmission power, and using the corresponding CSI value $CSI_m$ of the CSI report for the subsequent transmission.

In a second variation of the above embodiment, the m:th CSI value of the CSI report is based on a difference between an m:th assumed first transmission power and an m:th value $\delta_m$, and wherein the determining 24 comprises determining the CSI value based on the value $\delta_m$ which minimizes an offset of the assumed first power transmission to the determined second transmission power, and using the corresponding CSI value $CSI_m$ of the CSI report for the subsequent transmission.

In various embodiments, the CSI report is performed in a k:th time interval, and the assumed first transmission power is set to be equal to the second transmission power determined in a (k−n):th time interval preceding the k:th time interval by an integer n.

Figure 5:
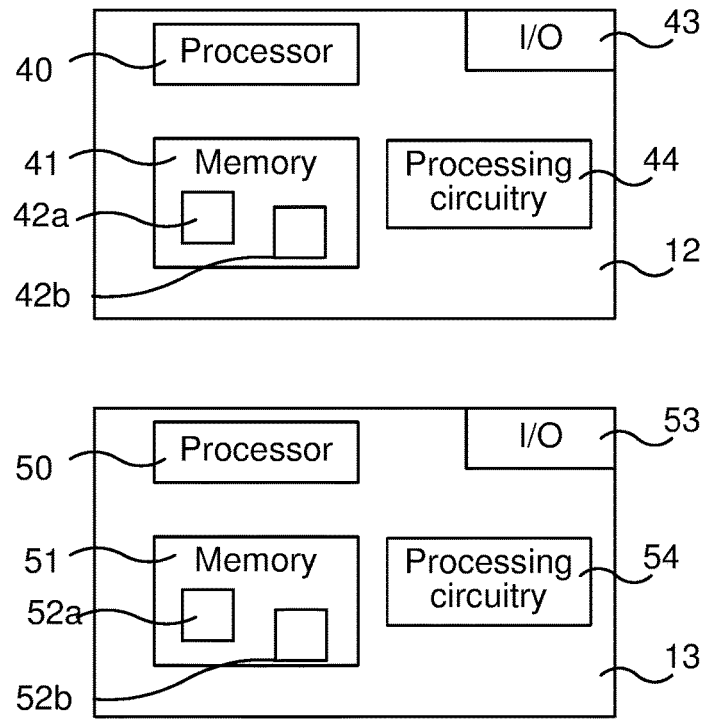
FIG. 5 illustrates schematically D2D capable devices and means for implementing embodiments in accordance with the present teachings.

FIG. 5 illustrates schematically D2D capable devices and means for implementing embodiments in accordance with the present teachings. The various embodiments of the method 20 as described e.g. in relation to FIG. 4 may be implemented in a D2D capable device.

The first and second D2D capable devices 12, 13 comprise a respective processor 40, 50. Such processor 40, 50 may comprise any combination of one or more of a central processing unit (CPU), multiprocessor, microcontroller, digital signal processor (DSP), application specific integrated circuit etc. capable of executing software instructions stored in a memory 41, 51 which can thus be a computer program product 41, 51. The processor 40, 50 can be configured to execute any of the various embodiments of the method 20 for instance as described in relation to FIG. 4 and also the method 30 described in relation to FIG. 6.

The memory 41, 51 can be any combination of read and write memory (RAM) and read only memory (ROM), Flash memory, magnetic tape, Compact Disc (CD)-ROM, digital versatile disc (DVD), Blu-ray disc etc. The memory 41, 51 also comprises persistent storage, which, for example, can be any single one or combination of magnetic memory, optical memory, solid state memory or even remotely mounted memory.

The D2D capable devices 12, 13 also comprise an input/output device 43, 53 (indicated by I/O in FIG. 5) for communicating with other entities. Such input/output device 43, 53 may for instance comprise a communication interface, processing circuitry for reception and transmission of wireless signaling, antenna devices etc.

The present teachings provide computer programs 42, 52 for the D2D capable devices 12, 13. The computer programs 42a, 42b, 52a, 52b comprise computer program code, which, when executed on at least one processor 40, 50 on the D2D capable device 12, 13 causes the D2D capable device 12, 13 to perform the method 20 according to any of the described embodiments thereof and the method 30 according to any of the described embodiments thereof (e.g. as described with reference to FIG. 6). For instance, a first computer program 42a of the transmitting node UE 12 may be executed on the processor 40 of the UE 12, whereby the UE 12 is caused to perform the method 20. A second computer program 42b of the transmitting node UE 12 may be executed on the processor 40 of the UE 12, whereby the UE 12 is caused to perform the method 30. Correspondingly, a first computer program 52a of the reception node UE 13 may be executed on the processor 50 of the UE 13, whereby the UE 13 is caused to perform the method 30. A second computer program 52b of the reception node UE 13 may be executed on the processor 50 of the UE 13, whereby the UE 13 is caused to perform the method 20. Both UEs 12, 13 may thus be configured to act as a transmitting node as well as a reception node and perform the corresponding methods 20, 30.

The present disclosure also encompasses computer program products 41, 51 comprising computer programs 42a, 42b, 52a, 52b for implementing the embodiments of the method as described, and a computer readable means on which the computer programs 42a, 42b, 52a, 52b are stored. The computer program product 41, 51 may, as mentioned earlier, be any combination of random access memory (RAM) or read only memory (ROM), Flash memory, magnetic tape, Compact Disc (CD)-ROM, digital versatile disc (DVD), Blu-ray disc etc.

A first device-to-device, D2D, capable device 12 for enabling measurements for handling of side link in a cellular system 10 is provided. The first D2D capable device 12 is configured to:

provide, to a second D2D device 13, information relating to a first transmission power of a first transmission between the first D2D device 12 and the second D2D device 13, wherein the first transmission power is used by the first D2D capable device 12, and receive, from the second D2D device 13, a measurement report based on the provided information relating to the first transmission power.

The first D2D capable device 12 may be configured to perform the above steps e.g. by comprising a processor 40 and memory 41, the memory 41 containing instructions executable by the processor 40, whereby the first D2D capable device 12 is operative to perform the steps.

In an embodiment, the information relating to the first transmission power comprises a first transmission power value.

In a variation of the above embodiment, the information further comprises information about an interval during which the first transmission power value is considered constant.

In an embodiment, the information relating to the first transmission power comprises an indication of a power change of the first transmission power.

In an embodiment, the information relating to the first transmission power comprises a rule defining when a transmission power change of the first transmission power is to be expected.

In an embodiment, the measurement report comprises a channel state information, CSI, report, comprising an integer M number of CSI values, and wherein the first D2D capable device 12 is configured to:

determine a second transmission power of a second transmission between the first D2D device 12 and the second D2D device 13, wherein the second transmission power is subject to power control of the cellular system 10, and determine a CSI value of the CSI report to use for a subsequent transmission based on an assumed first transmission power and the determined second transmission power.

The CSI report may, as mentioned earlier, comprise e.g. a rank indicator (RI), and/or precoding matrix indicator (PMI) and/or channel quality index (CQI). It is noted that the particular details of the CSIs report may differ e.g. depending on the Multiple-Input-Multiple-Output (MIMO) scheme at hand. Generally, CQI is always needed, RI is needed if the used MIMO scheme allows multiple layers/streams, PMI is mandatory when a code-book based MIMO scheme is used. The integer M may comprise a set of CQI value and possibly a PMI value and possibly a RI value accordingly. The CSI report may, as a particular example, comprise a triplet of values: a CQI value, a PMI value and a RI value. The calculations of each of CQI, PMI, RI may be based on a transmission power assumption (the assumed first transmission power).

In a first variation of the above embodiment, the m:th CSI value of the CSI report is based on a difference between the assumed first transmission power and m multiplied with a constant 6, and wherein the first D2D capable device 12 is configured to determine the CSI value to use based on the integer m which minimizes an offset of the assumed first transmission power to the determined second transmission power, and configured to use the corresponding CSI value $CSI_m$ of the CSI report for the subsequent transmission.

In a second variation of the above embodiment, the m:th CSI value of the CSI report is based on a difference between an m:th assumed first transmission power and an m:th value $\delta_m$, and wherein the first D2D capable device 12 is configured to determine the CSI value based on the value $\delta_m$ which minimizes an offset of the assumed first power transmission to the determined second transmission power, and configured to use the corresponding CSI value $CSI_m$ of the CSI report for the subsequent transmission.

In various embodiments, the CSI report is performed in a k:th time interval, and the assumed first transmission power is set to be equal to the second transmission power determined in a (k−n):th time interval preceding the k:th time interval by an integer n.

The computer program products, or the memories, comprises instructions executable by the processor 40. Such instructions may be comprised in a computer program, or in one or more software modules or function modules.

The features and embodiments of the present teachings that have been described may be combined in different ways, examples of which are given in the following, with reference to FIG. 6.

Figure 6:
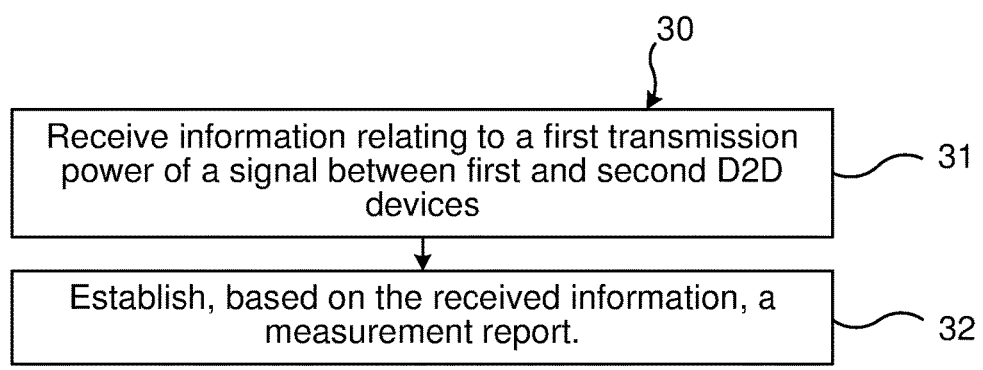
FIG. 6 illustrates a flow chart over steps of a method in a D2D capable device in accordance with an embodiment of the present teachings.

FIG. 6 illustrates a flow chart over steps of a method in a second D2D capable device 13 in accordance with an embodiment of the present teachings.

A method 30 of enabling measurements for handling of a device-to-device, D2D, side link in a cellular system 10 is provided. The method 30 is performed in a second D2D capable device 13 and comprises:

receiving 31, from a first D2D device 12, information relating to a first transmission power of a signal used between the first and second D2D devices 12, 13, and establishing 32, based on the received information, a measurement report.

As has been described earlier, the second D2D capable device 13 may use the information relating to the first transmission power in order to correct any measurement for changes due to dynamically changing transmission power. For instance, the second D2D capable device 13 may measure on a reference signal transmitted by the first D2D capable device 12, and estimate e.g. reference signal received power (RSRP) thereof. Having received information relating to the used transmission power $P_{Tx}$, the second D2D capable device 13 is now in position to determine an accurate instantaneous pathloss to be the difference between $P_{Tx}$ and the estimated RSRP.

After removing the $P_{Tx}$ from the RSRP, an actual pathloss may be estimated by filtering of instantaneous pathloss estimations for different transmission occasions. A still further improved accuracy is obtained. It is noted that this is different from conventional pathloss estimations, wherein the reference power is fixed.

As another example, instead of estimating RSRP, the second D2D capable device 13 may measure the reference signal sent by the first D2D capable device 12 and estimate SINR based on this measurement and the received information about the first transmission power. As a particular example thereof the second D2D capable device 13 estimates SINR for the k:th transmission interval, and scales down the SINR(k) based on the received information about the first transmission power. The scaled SINR(k) is then filtered and by combining the received information about the first transmission power with the filtered SINR(k), the filtered SINR(k) may be scaled up to obtain the estimated actual SINR for the latest transmission (e.g. (k+4):th transmission).

In an embodiment, the establishing 32 comprises establishing channel state information, CSI, for an integer number, M, of first transmission power assumptions.

In various embodiments, the received information comprises an indication of a power change of the first transmission power.

In various embodiments, the received information comprises a first transmission power value and information about an interval during which the first transmission power is considered constant, and wherein the establishing 32 comprises establishing a channel state information, CSI, value based on the value of the first transmission power within the interval and a measured received transmission power.

In various embodiments, the method 30 comprises transmitting, to the first D2D device 12, the established measurement report.

A second, device to-device, D2D, capable device 13 for enabling measurements for handling of a device-to-device, D2D, side link in a cellular system 10 is provided, as have also been described with reference to FIG. 5. The second D2D capable device 13 is configured to:

receive, from a first D2D device 12, information relating to a first transmission power of a signal used between the first and second D2D devices 12, 13, and establish, based on the received information, a measurement report.

The second D2D capable device 13 may be configured to perform the above steps e.g. by comprising a processor 50 and memory 51, the memory 51 containing instructions executable by the processor 50, whereby the second D2D capable device 13 is operative to perform the steps.

In an embodiment, the second D2D capable device 13 is configured to establish channel state information, CSI, for an integer number, M, of first transmission power assumptions.

In various embodiments, the received information comprises an indication of a power change of the first transmission power.

In an embodiment, the received information comprises a first transmission power value and information about an interval during which the first transmission power is considered constant, and the second D2D capable device 13 is configured to establish a channel state information, CSI, value based on the value of the first transmission power within the interval and a measured received transmission power.

In various embodiments, the second D2D capable device 13 is configured to transmit, to the first D2D device 12, the established measurement report.

As have been noted earlier, the method 20 described with reference to FIG. 3 and the method 30 described with reference to FIG. 6 may, although described as being performed in a first and second D2D capable device, respectively, be implemented in a single D2D capable device, performing the former method 20 when acting as transmitting node and the latter method 30 when acting as reception node.

The computer program products, or the memories, comprises instructions executable by the processor 50. Such instructions may be comprised in a computer program, or in one or more software modules or function modules.

Figure 7:
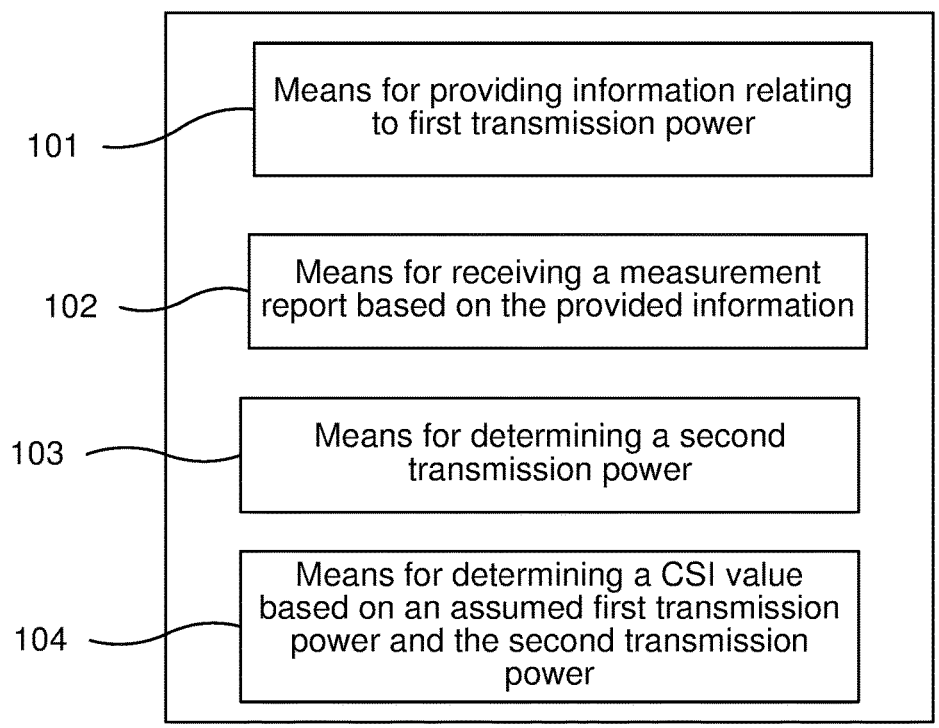
FIG. 7 illustrates a first D2D capable device comprising function modules for implementing embodiments of the method of the present teachings.

FIG. 7 illustrates an implementation of the first D2D capable device 12 using function modules and/or software modules. In particular, FIG. 7 illustrates a D2D capable device 12 comprising function modules for implementing embodiments of the methods of the present teachings.

A first D2D capable device for enabling measurements for handing of a D2D side link in a cellular system 1 is provided. The first D2D capable device comprises first means 101 for providing, to a second D2D device, information relating to a first transmission power of a first transmission between the first D2D device and the second D2D device, wherein the first transmission power is used by the first D2D capable. Such first means 101 may for instance comprise an input/output device as described earlier, e.g. a communication interface, and/or it may comprise any type of processing circuitry (e.g. processing circuitry 44 indicated in FIG. 5) for transmitting data.

The first D2D capable device comprises second means 102 for receiving, from the second D2D device, a measurement report based on the provided information relating to the first transmission power. Such second means 102 may for instance comprise an input/output device as described earlier, e.g. a communication interface, and/or it may comprise any type of processing circuitry for receiving data.

The first D2D capable device may comprise still further means for implementing embodiments of the method 20 as has been described. For instance, the first D2D capable device may comprise third means 103 for determining a second transmission power of a second transmission between the first D2D device and the second D2D device, wherein the second transmission power is subject to power control of the cellular system. Such third means 103 may for instance comprise processing circuitry adapted for such determining of transmission power and/or any measuring means.

The first D2D capable device may comprise fourth means 104 for determining a CSI value of the CSI report to use for a subsequent transmission based on an assumed first transmission power and the determined second transmission power. Such fourth means 104 may for instance comprise processing circuitry adapted for such determining of CSI value.

The means 101, 102, 103, 104, e.g. function modules, can be implemented using software instructions such as computer program executing in a processor and/or using hardware, such as application specific integrated circuits, field programmable gate arrays, discrete logical components etc., or any combination thereof.

Figure 8:
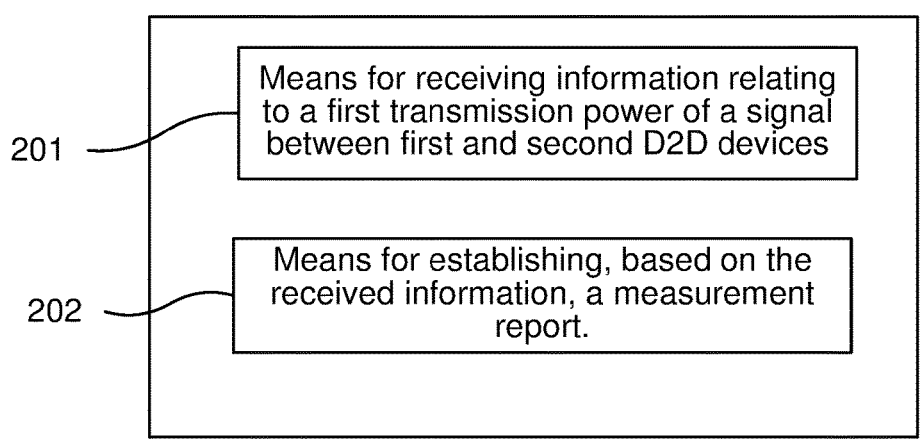
FIG. 8 illustrates a second D2D capable device comprising function modules for implementing embodiments of the method of the present teachings.

FIG. 8 illustrates an implementation of the second D2D capable device 13 using function modules and/or software modules. In particular, FIG. 8 illustrates a second D2D capable device comprising function modules for implementing embodiments of the method of the present teachings.

In particular, a second D2D capable device for enabling measurements for handing of a D2D side link in a cellular system is provided. The first D2D capable device comprises first means 201 for receiving, from a first D2D device, information relating to a first transmission power of a signal used between the first and second D2D devices. Such first means 201 may for instance comprise an input/output device as described earlier, e.g. a communication interface, and/or it may comprise any type of processing circuitry (e.g. processing circuitry 54 indicated in FIG. 5) for receiving wireless signaling.

The second D2D capable device comprises second means 202 for establishing, based on the received information, a measurement report. Such second means 202 may for instance comprise any type of processing circuitry adapted for such establishing of a measurement report.

The second D2D capable device may comprise still further means (not illustrated in FIG. 8) for implementing embodiments of the method 30 as has been described.

The means 201, 202, e.g. function modules, can be implemented using software instructions such as computer program executing in a processor and/or using hardware, such as application specific integrated circuits, field programmable gate arrays, discrete logical components etc., or any combination thereof.

The invention has mainly been described herein with reference to a few embodiments. However, as is appreciated by a person skilled in the art, other embodiments than the particular ones disclosed herein are equally possible within the scope of the invention, as defined by the appended patent claims.

What is claimed is:

1. A method of enabling measurements for handling of a device-to-device (D2D) side link in a cellular system, the method being performed in a first D2D device and comprising:
providing, to a second D2D device, information relating to a first transmission power of a first transmission between the first D2D device and the second D2D device, wherein the first transmission power is used by the first D2D device, wherein the information further comprises information about an interval during which the first transmission power is considered constant; and
receiving, from the second D2D device, a measurement report based on the information relating to the first transmission power.

2. The method as claimed in claim 1, wherein the information relating to the first transmission power comprises a first transmission power value.

3. The method as claimed in claim 2, wherein the information relating to the first transmission power comprises an indication of a power change of the first transmission power.

4. A first device-to-device (D2D) device configured for enabling measurements for handling of side link in a cellular system, the first D2D device comprising:
communication circuitry configured for D2D communications; and
processing circuitry operatively associated with the communication circuitry and configured to:
provide, to a second D2D device, information relating to a first transmission power of a first transmission between the first D2D device and the second D2D device, wherein the first transmission power is used by the first D2D device, wherein the information further comprises information about an interval during which the first transmission power is considered constant; and
receive, from the second D2D device, a measurement report based on the information relating to the first transmission power.

5. The first D2D device as claimed in claim 4, wherein the information relating to the first transmission power comprises a first transmission power value.

6. The first D2D device as claimed in claim 4, wherein the information relating to the first transmission power comprises an indication of a power change of the first transmission power.

7. A method of enabling measurements for handling of a device-to-device (D2D) side link in a cellular system, the method being performed in a second D2D device and comprising:
receiving, from a first D2D device, information relating to a first transmission power of a signal used between the first and second D2D devices, wherein the received information comprises a first transmission power value and information about an interval during which the first transmission power is considered constant; and
establishing, based on the received information, a measurement report, wherein establishing the measurement report comprises establishing a channel state information (CSI) value based on the first transmission power value within the interval and a measured received transmission power.

8. The method as claimed in claim 7, wherein the received information comprises an indication of a power change of the first transmission power.

9. A second device to-device (D2D) device configured for enabling measurements for handling of a D2D side link in a cellular system, the second D2D device comprising:
communication circuitry configured for D2D communications; and processing circuitry operatively associated with the communication circuitry and configured to:
receive, from a first D2D device, information relating to a first transmission power of a signal used between the first and second D2D devices, wherein the received information comprises a first transmission power value and information about an interval during which the first transmission power is considered constant; and establish, based on the received information, a measurement report, wherein establishing the measurement report comprises establishing a channel state information (CSI) value based on the first transmission power value within the interval and a measured received transmission power.

10. The second D2D device as claimed in claim 9, wherein the received information comprises an indication of a power change of the first transmission power.

* * * * *